United States Patent [19]

Nakayama et al.

[11] 4,418,779
[45] Dec. 6, 1983

[54] CONTROL APPARATUS FOR VEHICLE STEERING SYSTEM

[75] Inventors: Masafumi Nakayama; Tokiyoshi Yanai; Masato Fukino, all of Yokosuka, Japan

[73] Assignee: Nissan Motor Company, Limited, Yokohama, Japan

[21] Appl. No.: 372,446

[22] Filed: Apr. 27, 1982

[30] Foreign Application Priority Data

Jun. 12, 1981 [JP] Japan .................................. 56-90462

[51] Int. Cl.$^3$ ............................................. B62D 5/08
[52] U.S. Cl. .................................... 180/141; 91/370; 91/434; 180/148
[58] Field of Search ............... 180/143, 141, 148, 132; 91/434, 370, 371

[56] References Cited

FOREIGN PATENT DOCUMENTS 51-42820 11/1976 Japan .

Primary Examiner—John A. Pekar
Attorney, Agent, or Firm—Lane, Aitken & Kananen

[57] ABSTRACT

A control apparatus for a power-assisted steering system, comprising a power cylinder having pressure acting chambers respectively communicating with the control ports of a pressure control valve having inlet and outlet ports respectively communicable with the delivery and suction ports of a pump, and first and second flow control valves each having an inlet port and a discharge port communicating with the suction port of the pump, each flow control valve including a control pressure acting chamber communicating with a pressure acting chamber of the power cylinder to develop a differential pressure variable with a differential pressure between the pressure acting chambers of the cylinder, and a valve member movable in response to the differential pressure acting thereon and urged to provide communication between the inlet and discharge ports of each flow control valve, the inlet port of the first flow control valve being in constant communication with the delivery port of the pump and the inlet port of the pressure control valve, the inlet port of the second flow control valve being in constant communication with the outlet port of the pressure control valve, the valve member of each flow control valve being operative to block the communication between the inlet and discharge ports of the valve when the differential pressure is higher than a predetermined value, the second flow control valve further comprising a bypass providing constant communication between the outlet port of the pressure control valve and the suction port of the pump independently of the valve member.

6 Claims, 3 Drawing Figures

CONTROL APPARATUS FOR VEHICLE STEERING SYSTEM

FIELD OF THE INVENTION

The present invention relates to a fluid-operated control apparatus for a power-assisted steering system of a steerable vehicle and, more particularly to a fluid-operated control apparatus adapted to boost a driver's manual effort applied to the steering wheel and shaft assembly with a hydraulic fluid pressure which is developed by fluid displacement means such as a fluid feed pump driven by a power unit such as an internal combustion engine of, typically, an automotive vehicle.

BACKGROUND OF THE INVENTION

It is well known in the art that the reaction transmitted from the steered road wheels of an automotive vehicle to the driver's manipulative effort applied to the steering wheel when the road wheels are being steered increases with a decrease in the vehicle speed and peaks up when the vehicle is held at a halt. An up-to-date automotive vehicle is therefore equipped with a power-assisted steering system principally with a view to permitting a vehicle driver to maneuver the steering system with a reduced manipulative effort. A power-assisted steering system developed for this purpose has a steering pressure control valve in which the fluid pressure developed by a fluid feed pump usually driven by an internal combustion engine is regulated to vary with the driver's manual effort applied to the steering wheel. The fluid pressure thus regulated by the steering pressure control valve is supplied to a steering power cylinder assembly so as to create a hydraulic steering assistance competent with the driver's manual effort applied to the steering wheel. The fluid feed pump of a power-assisted steering system is usually driven to deliver pressurized fluid not only when the steering system is maintained inoperative with the steering wheel held in the straight-ahead angular position but during left-turn and right-turn conditions of the steering system.

The steering pressure control valve thus used in a power-assisted steering system has incorporated therein a flow restriction which is causative of a resistance to the flow of fluid through the control valve. The resistance gives rise to an increase in the burden imposed on the fluid feed pump and invites a loss in the power produced by the internal combustion engine driving the pump under not only the inoperative condition but also the operative conditions of the steering system. The loss in the power delivered from the engine results in waste of fuel and accordingly in deterioration in the fuel economy of the engine. When, furthermore, a pressurized fluid is passed through the flow restriction in the steering pressure control valve at a high velocity, a vacuum tends to be developed immediately downstream of the flow restriction and to cause cavitation in the flow of the fluid through the flow restriction. The cavitation thus caused in the control valve in turn causes production of unpleasant noises and vibrations in the valve. To preclude the occurrence of cavitation in the control valve, it has been proposed to have an orifice provided downstream of the flow restriction so as to increase the fluid pressure at the outlet of the flow restriction so as to avoid development of the vacuum which is responsible for the cavitation. Provision of the orifice downstream of the flow restriction however results in addition of a resistance to the flow of fluid through the control valve and accordingly in an increase in the burden exercised on the fluid feed pump.

An advanced version of power-assisted steering has therefore been proposed in, for example, Japanese Patent Publication No. 51-42820 for providing a solution to these problems encountered in a prior-art power-assisted steering system of the described type. The steering system therein taught has a fluid-flow control valve provided in combination with a steering pressure control valve. The fluid-flow control valve is disposed in a fluid line leading from the steering pressure control valve to the suction port of the fluid feed pump and includes a fluid discharge passageway forming part of the fluid line, a valve chamber crossing the fluid discharge passageway, and a valve spool movable in the valve chamber. The valve spool is responsive to a differential fluid pressure developed between the pressure acting chambers of the steering power cylinder assembly and is formed with a circumferential groove which is communicating with the fluid discharge passageway depending upon the axial position of the valve spool in the valve chamber. In the presence of a differential fluid pressure acting on the valve spool, the circumferential groove in the valve spool constitutes a flow restriction in the fluid discharge passageway so as to increase the fluid pressure downstream of the flow restriction in the steering pressure control valve. In the absence of a differential fluid pressure acting on the valve spool, the groove in the valve spool provides unrestricted fluid communication through the valve chamber so that the fluid passageway has practically no flow restriction formed therein. A drawback inherent in a prior-art power-assisted steering system is, however, still encountered in such an advanced version of the steering system in that the steering pressure control valve per se has a flow restriction provided therein and, for this reason, can not eliminate the resistance imposed on the flow of fluid therethrough particularly under the inoperative condition of the steering system.

The present invention contemplates provision of an improved fluid-operated control apparatus for a steering system overcoming these drawbacks of prior-art power-assisted steering systems of the described general natures.

SUMMARY OF THE INVENTION

In accordance with the present invention, there is provided a fluid-operated control apparatus for a power-assisted steering system including a steering wheel and shaft assembly rotatable about an axis therethrough in a steerable vehicle, comprising fluid-displacement means including a suction port to suck in supplied fluid and a delivery port to deliver fluid under pressure therefrom; a steering pressure control valve responsive to turning motion of the steering wheel and shaft assembly and having a fluid inlet port communicable with the delivery port of the fluid-displacement means, a fluid outlet port communicable with the suction port of the fluid displacement means, and two control fluid ports, the control valve being shiftable between a condition providing communication between the fluid inlet and outlet ports and having the control fluid ports isolated from the fluid inlet and outlet ports, and a condition providing communication between the fluid inlet port and one of the control fluid ports and communication between the fluid outlet port and the other of the control fluid ports; a steering power cylinder assembly comprising a housing and a piston operatively connected to the wheel and shaft assembly and movable in the housing for having formed therein two pressure acting chambers separate from each other across the piston and communicating with the control fluid ports, respectively; and first and second fluid-flow control valves respectively having first and second valve casing portions each formed with an elongated cavity, a fluid inlet port and a fluid discharge port communicating with the suction port of the fluid displacement means, each of the first and second fluid-flow control valves comprising (1) differential pressure producing means operative to develop in the above mentioned cavity a differential pressure continuously variable with a differential pressure between the pressure acting chambers of the cylinder assembly, (2) a valve member movable in the cavity and responsive to the differential fluid pressure developed by the differential pressure producing means, and (3) biasing means urging the valve member to stay in a predetermined equilibrium position in the cavity in the absence of a differential fluid pressure acting thereon for providing full communication between the fluid inlet and discharge ports of each of the fluid-flow control valves when the valve member is in the equilibrium position thereof and being movable from the equilibrium position a distance which is continuously variable with the differential fluid pressure acting on the valve member; the fluid inlet port of the first fluid-flow control valve being in constant communication with the delivery port of the fluid displacement means and with the fluid inlet port of the steering pressure control valve and the fluid inlet port of the second fluid-flow control valve being in constant communication with the fluid outlet port of the steering pressure control valve, the valve member of the first fluid-flow control valve being operative to block the communication between the fluid inlet and discharge ports of the first fluid-flow control valve when the differential fluid pressure acting thereon is higher than a first predetermined value and the the valve member of the second fluid-flow control valve being operative to block the communication between the fluid inlet and discharge ports of the second fluid-flow control valve when the differential fluid pressure acting thereon is higher than a second predetermined value, the second fluid-flow control valve further comprising bypass means providing constant communication between the fluid outlet port of the steering pressure control valve and the suction port of the fluid displacement means without respect to the position of the valve member of the second fluid-flow control valve in the cavity thereof.

BRIEF DESCRIPTION OF THE ACCOMPANYING DRAWINGS

The features and advantages of a fluid-operated control apparatus for a power-assisted steering system according to the present invention will be appreciated more clearly from the following description take in conjunction with the accompanying drawings in which.

DETAILED DESCRIPTION OF THE INVENTION

Figure 1:
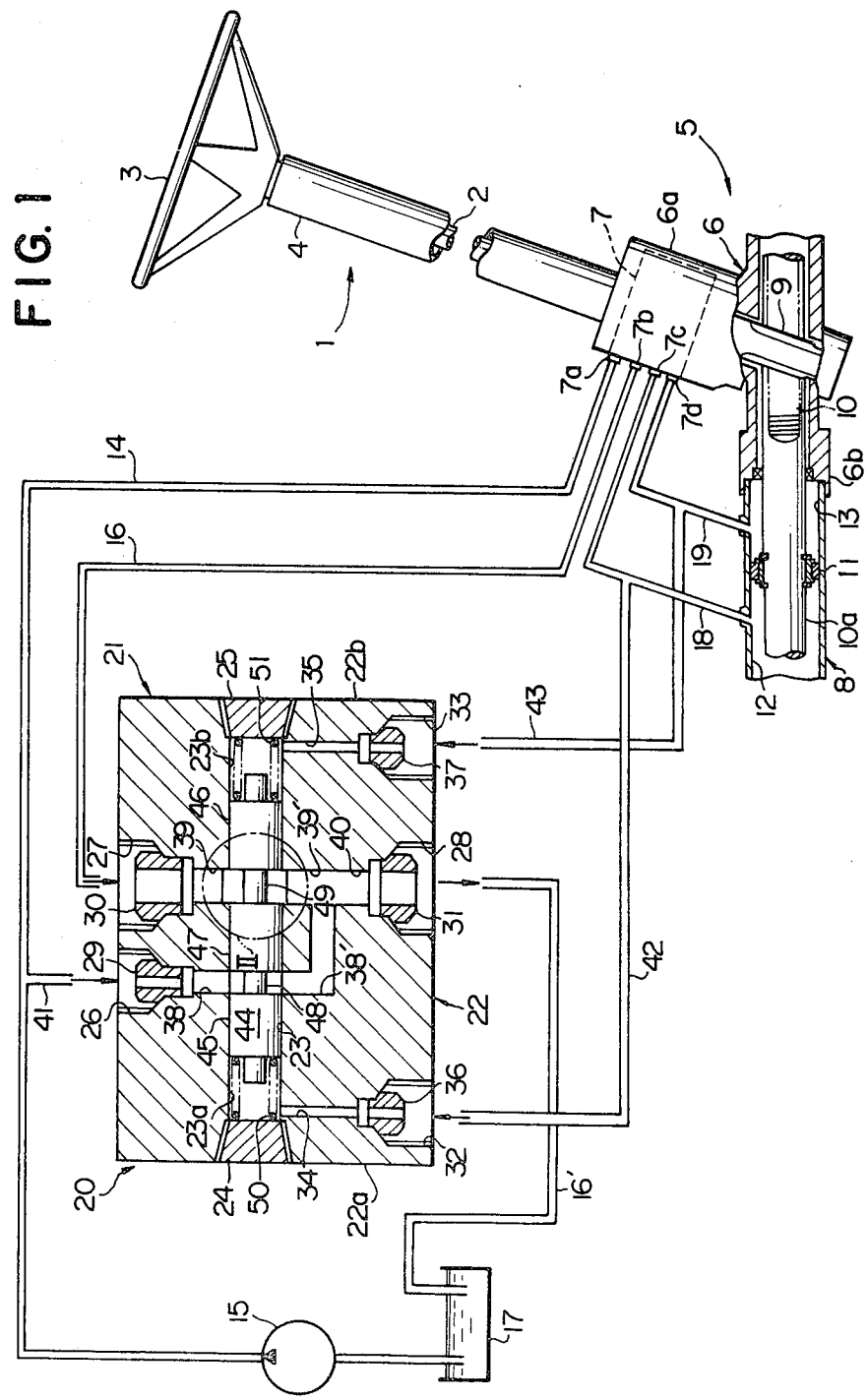
FIG. 1 is a schematic view showing, partially in longitudinal section, a preferred embodiment of a fluid-operated steering control apparatus for a power-assisted steering system according to the present invention.

Referring to FIG. 1 of the drawings, a fluid-operated steerng control apparatus embodying the present invention forms part of a vehicle steering system comprising a steering wheel and shaft assembly 1 which includes a steering shaft 2 carrying a steering wheel 3 and axially extending through a hollow steering column tube 4. The control apparatus comprises a steering gear unit 5 having a housing 6 including valve and cylinder housing portions 6a and 6b respectively having incorporated therein a steering pressure control valve 7 and a steering power cylinder assembly 8 only portions of which are herein shown. The control valve 7 has fluid inlet and outlet ports 7a and 7b and first and second control fluid ports 7c and 7d. The steering shaft 2 is coupled to a pinion gear 9 forming part of the power cylinder assembly 8 which further comprises a toothed rack member 10 with which the pinion gear 9 is held in constant mesh. The rack member 10 is movable in the cylinder housing portion 6b and has a longitudinal extension 10a extending from the toothed portion thereof and having a piston 11 fixedly carried thereon. The power piston 11 forms in the housing portion 6b first and second pressure acting chambers 12 and 13 across the piston 11. The control valve 7 and the power cylinder assembly 8 are designed so that there will be no differential fluid pressure developed between the first and second pressure acting chambers 12 and 13 of the cylinder assembly 8 when the first and second control fluid ports 7c and 7d of the control valve 7 are isolated from the fluid inlet and outlet ports 7a and 7b or, in other words, communication is established directly between the fluid inlet and outlet ports 7a and 7b of the control valve 7.

The fluid inlet port 7a of the valve 7 is in constant communication through a fluid feed passageway 14 with the delivery port of a steering fluid feed pump 15, while the fluid outlet port 7b of the control valve 7 is communicable through fluid discharge passageways 16 and 16' with the suction port of a fluid reservoir 17 which further communicates with the suction port of the pump 15. Thus, the fluid discharge passageway 16 leads from the fluid outlet port 7b of the control valve 7, while the fluid discharge passageway 16' terminates in the fluid reservoir 17, as will be more clearly described. On the other hand, the first and second control fluid ports 7c and 7d of the control valve 7 communicate through steering pressure control fluid passageways 18 and 19 to the above mentioned pressure acting chambers 12 and 13, respectively, of the cylinder assembly 8. In the control apparatus according to the present invention, the fluid feed pump 15 constitutes fluid displacement means operative to deliver fluid under pressure therefrom and to suck in fluid from the fluid reservoir 17 adapted to have fluid stored therein. The fluid feed pump 15 is belted, geared or otherwise operatively connected to the output shaft of an internal combustion engine installed on an automotive vehicle, though not shown in the drawings.

The pressure control valve 7 is shiftable between left-turn and right-turn driving conditions and a straight-ahead driving condition depending upon the rotational position of the steering shaft 2 about the center axis thereof. Throughout these conditions of the control valve 7, a fluid pressure is developed in the fluid inlet port 7a thereof and further in each of the first and second control fluid ports 7c and 7d of the control valve 7. Under the straight-ahead driving condition of the control valve 7, communication is established between the fluid inlet and outlet ports 7a and 7b, both of which are however isolated from the first and second control fluid ports 7c and 7d. When the left-turn or right-turn driving condition is established in the control valve 7, the fluid inlet port 7a of the control valve 7 is permitted to communicate with one of the first and second control fluid ports 7c and 7d while the fluid outlet port 7b is permitted to communicate with the other of the first and second control fluid ports 7c and 7d. The pressurized fluid delivered from the pump 15 is thus supplied through the fluid feed passageway 14 and by way of the fluid inlet port 7a and one of the first and second control fluid ports 7c and 7d of the control valve 7 to the pressure control fluid passageway 18 or 19 and enters one of the first and second pressure acting chambers 12 and 13. The fluid pressure thus admitted into one of the pressure acting chambers 12 and 13 acts on the piston 11 and urges the power piston 11 and accordingly the rack member 10 to axially move in a direction in which the rack member 10 is driven to move in the cylinder housing portion 6b by the steering wheel and shaft assembly 1. Under these conditions, the other of the pressure acting chambers 12 and 13 is permitted to communicate with the fluid outlet port 7b of the valve 7.

The control apparatus embodying the present invention as shown in FIG. 1 further comprises a combination of first and second fluid-flow control valves 20 and 21 which are arranged in series with each other in a common valve casing 22. The valve casing 22 has a first casing portion 22a having the first fluid-flow control valve 20 incorporated therein and a second casing portion 22b having the second fluid-flow control valve 21 incorporated therein. In the embodiment herein shown, the valve casing 22 is formed with an axial cavity 23 axially elongated in part in the first valve casing portion 22a and in part in second valve casing portion 22b. Furthermore, the axial cavity 23 extends between the respective inner faces of end plugs 24 and 25 fitted into the casing portions 22a and 22b, respectively, and hermetically sealed from the axial cavity 23 in suitable manners. The valve casing 22 is further formed with a first fluid inlet port 26, a second fluid inlet port 27 and a fluid discharge port 28. The first and second fluid inlet ports 26 and 27 are formed in the first and second valve casing portions 22a and 22b, respectively, while the fluid discharge port 25 is common in the first and second casing portions 22a and 22b. Preferably, the first and second fluid inlet ports 26 and 27 have received therein bored fittings 29 and 30, respectively, each formed with an axial bore having a calibrated cross sectional area to provide a restricted flow of fluid therethrough. The cross sectional area of the axial bore in the fitting 29 in the first fluid inlet port 26 in particular is preferably selected so that the axial bore serves as a flow restriction or orifice for the reason that will be understood as the description proceeds. Likewise, the fluid discharge port 28 has received therein a bored fitting 31 formed with an axial bore having a calibrated cross sectional area to provide a restricted flow of fluid therethrough. The valve casing 22 is further formed with first and second control fluid ports 32 and 33 and first and second control fluid passageways 34 ad 35. The first control fluid port 32 is formed in the first valve casing portion 22a and is open to the first control fluid passageway 34 which is also formed in the casing portion 22a and which terminates in the above mentioned axial cavity 23 in proximity to the inner end face of the end plug member 24. The second control fluid port 33 is formed in the second valve casing portion 22b and is open to the second control fluid passageway 35 which is also formed in the casing portion 22b and which terminates in the axial cavity 23 in proximity to the inner end face of the end plug member 25. In this instance, it is also preferable that the first and second control fluid ports 32 and 33 have received therein bored fittings 36 and 37, respectively, each formed with an axial bore having a calibrated cross sectional area to provide a restricted flow of fuid therethrough.

The valve casing 22 is further formed with first fluid inlet and discharge passageways 38 and 38' and second fluid inlet and discharge passageways 39 and 39'. The first and second fluid inlet passageways 38 and 39 lead from the first and second fluid inlet ports 26 and 27, respectively, and are aligned with the first and second fluid discharge passageways 38' and 39', respectively, perpendicularly across the axial cavity 23 in the valve casing 22. The first and second fluid discharge passageways 38' and 39' communicate through a common fluid discharge passageway 40 with the fluid discharge port 28 in the valve casing 22.

The fluid feed passageway 14 leading from the delivery port of the fluid feed pump 15 to the fluid inlet port 7a of the steering pressure control valve 7 communicates through a branch passageway 41 with the first fluid inlet port 26 in the first casing portion 22a of the valve casing 22. On the other hand, the fluid discharge passageway 16 leading from the fluid outlet port 7b of the steering pressure control valve 7 terminates in the second fluid inlet port 27 in the second casing portion 22b of the valve casing 22. The fluid discharge passageway 16' terminating in the fluid reservoir 17 leads from the fluid discharge port 28 in the valve casing 22. Furthermore, the first and second control fluid ports 32 and 33 in the first and second casing portions 22a and 22b of the valve casing 22 communicate with first and second control fluid passageways 42 and 43 branched from the steering pressure control fluid passgeways 18 and 19, respectively.

In the shown embodiment of the control apparatus according to the present invention, the first and second fluid-flow control valves 20 and 21 further comprise, in common thereto, a valve spool 44 axially slidable in the axial cavity 23 in the valve casing 22. The valve spool 44 has first, second and third cylindrical land portions 45, 46 and 47 which are arranged in such a manner as to have the third land portion 47 disposed axially between the first and second land portions 45 and 46. The first and second land portions 45 and 46 are axially movable in the first and second valve casing portions 22a and 22b, respectively, while the third land portion 47 is axially movable partially in the first valve casing portion 22a and partially in the second valve casing portion 22b. The first and third land portions 45 and 47 are axially spaced apart from each other so as to form a circumferential groove 48 therebetween and, likewise, the second and third land portions 46 and 47 are axially spaced apart from each other so as to form a circumferential groove 49 therebetween. The valve spool 44 thus movably positioned in the axial cavity 23 in the valve casing 22 has formed in the axial cavity 23 first and second control pressure acting chamber portions 23a and 23b respectively constituted by opposite axial end portions of the axial cavity 23 and formed in the first and second valve casing portions 22a and 22b, respectively, of the valve casing 22. The first control pressure acting chamber portion 23a in the first valve casing portion 22a axially extends between the inner face of the end plug member 24 and the outer end face of the first land portion 45 of the valve spool 44, and likewise the second control pressure acting chamber portion 23b in the second valve casing portion 22b axially extends between the inner face of the end plug member 25 and the outer end face of the second land portion 46 of the valve spool 44. In the embodiment herein shown, the pressure acting chamber portions 23a and 23b of the cavity 23, the control fluid passageways 34 and 35 and the control fluid ports 32 and 33 in the valve casing 22 and the above mentioned control fluid passageways 42 and 43 constitute differential pressure producing means adapted to produce a differential fluid pressure which is variable continuously with the differential pressure between the first and second pressure acting chambers 12 and 13 of the steering power cylinder assembly 8.

When the valve spool 44 assumes a predetermined equilibrium axial position in the cavity 23, the first circumferential groove 48 between the first and third land portions 45 and 47 is located between and accordingly open to the first fluid inlet and discharge passageways 38 and 38' and, likewise, the second circumferential groove 49 between the second and third land portions 46 and 47 is located between and accordingly open to the second fluid inlet and discharge passageways 39 and 39' in the valve casing 22 as shown. The valve spool 44 is urged to stay in such an equilibrium axial position with respect to the passageways 38, 38', 39 and 39' by suitable biasing means. In the embodiment herein shown, the biasing means is assumed to comprise first and second preloaded helical compression springs 50 and 51 positioned in the above mentioned first and second control pressure acting chamber portions 23a and 23b, respectively. The first compression spring 50 in the control pressure acting chamber portion 23a is seated at one end thereof on the inner end face of the end plug member 24 and at the other end thereof the outer end face of the first land portion 45 of the valve spool 44. Similarly, the second compression spring 51 in the control pressure acting chamber portion 23b is seated at one end thereof on the inner end face of the end plug member 25 and at the other end thereof the outer end face of the second land portion 46 of the valve spool 44. The first and second compression springs 50 and 51 thus arranged are selected to have substantially equal spring constants so as to enable the valve spool 44 to assume the above mentioned equilibrium axial position thereof correctly in the absence of a fluid pressure in each of the control pressure acting chamber portions 23a and 23b of the axial cavity 23.

In the valve arrangement hereinbefore described, the first fluid-flow control assembly 20 is composed of the first valve casing portion 22a, an axial portion of the axial cavity 23, the first fluid inlet port 26, the fluid discharge port 28, the first fluid inlet and discharge passageways 38 and 38', the fluid passageway 40, the first and third land portions 45 and 47 of the valve spool 44 and the first compression spring 50. On the other hand, the second fluid-flow control assembly 21 is composed of the second valve casing portion 22b, an axial portion of the axial cavity 23, the second fluid inlet port 27, the fluid discharge port 28, the second fluid inlet and discharge passageways 39 and 39', the fluid passageway 40, the second and third land portion 46 and 47 of the valve spool 44 and the second compression spring 51. Thus, the axial cavity 23, the fluid discharge port 28, the fluid passageway 40, and the third land portion 47 of the valve spool 44 are common to both of the first and second fluid-flow control valves 20 and 21.

Figure 2:
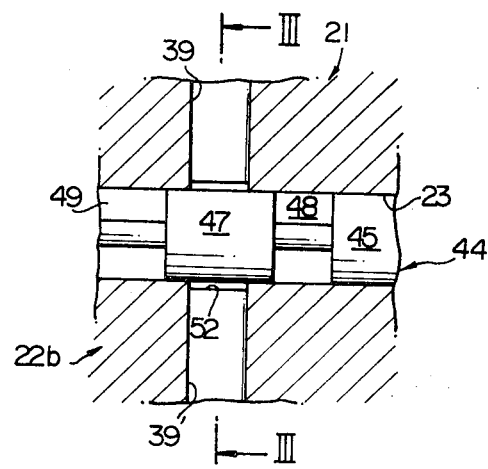
FIG. 2 is a view showing, to an enlarged scale, a portion enclosed by a circle indicated by II in FIG. 1.
Figure 3:
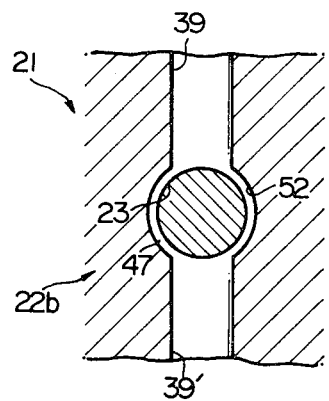
FIG. 3 is a cross sectional view taken along line III-—III in FIG. 2.

In the embodiment of the control apparatus according to the present invention, the second fluid-flow control valve 21 further comprises bypass means providing constant communication between the second fluid inlet and discharge passageways 39 and 39' independently of the circumferential groove 49 in the valve spool 44 or, in other words, independently of the axial position of the valve spool 44 in the axial cavity 23 in the valve casing 22. As shown in FIGS. 2 and 3 of the drawings, the bypass means in the fluid-operated control apparatus embodying the present invention is assumed, by way of example, as comprising an internal circumferential groove 52 formed in the second valve casing portion 22b. The internal circumferential groove 52 coaxially surrounds an axial portion of the axial cavity 23 and to be radially open to both of the second fluid inlet and discharge passageways 39 and 39' in the casing portion 22b of the valve casing 22. Constant communication is thus established between the second fluid inlet and discharge passageways 39 and 39' through this internal circumferential groove 52 independently of the circumferential groove 49 in the valve spool 44, viz., independently of the axial position of the valve spool 44 in the axial cavity 23 in the valve casing 22.

Description will now be made regarding the operation of the fluid-operated control apparatus constructed and arranged as described above in accordance with the present invention.

When the internal combustion engine of the vehicle is in operation driving the steering fluid feed pump 15, a pressurized fluid is delivered from the fluid feed pump 15 at a flow rate which is approximately variable in direct proportion to the output speed of the engine. As is well known in the art, the fluid feed pump 15 of the steering system is driven by the engine uninterruptedly throughout operation of the engine with a view to assuring prompt response of the steering power cylinder assembly 8 to actuation of the steering pressure control valve 7. The pressurized fluid thus delivered incessantly from the fluid feed pump 15 is directed through the fluid feed passageway 14 to the fluid inlet port 7a of the steering pressure control valve 7. If, under these conditions, the steering wheel 3 is maintained in a straight-ahead position about the axis of the steering shaft 2, the previously mentioned straight-ahead driving condition is established in the control valve 7 so that communication is provided between the fluid inlet and outlet ports 7a and 7b of the control valve 7. The pressurized fluid supplied to the fluid inlet port 7a from the fluid feed pump 15 via the fluid feed passageway 14 is, accordingly, passed direct from the fluid inlet port 7a to the fluid outlet port 7b of the control valve 7 and is directed to the fluid discharge passageway 16 without being supplied to the cylinder assembly 8. The fluid pressure being thus not supplied to the cylinder assembly 8, the fluid pressures in the first and second pressure acting chambers 12 and 13 of the power cylinder assembly 8 remain equal to each other. Equal fluid pressures are thus also established in the first and second control pressure chamber portions 23a and 23b of the axial cavity 23 in the valve casing 22 through the first and second control fluid pressure passageways 42 and 43.

There being no differential fluid pressure developed between the first and second pressure acting chambers 12 and 13 of the steering power cylinder assembly 8, the valve spool 44 in the valve casing 22 is maintained in the previously mentioned predetermined equilibrium axial position thereof in the axial cavity 23 by the equalized biasing forces of the first and second compression springs 50 and 51. The valve spool 44 thus held in the equilibrium axial position in the cavity 23 establishes communication between the first fluid inlet and discharge passageways 38 and 38' in the first valve casing portion 22a through the first circumferential groove 48 in the valve spool 44 and between the second fluid inlet and discharge passageways 39 and 39' in the second valve casing portion 22b through the second circumferential groove 49 in the valve spool 44 as shown in FIG. 1. As a consequence, the pressurized fluid delivered from the fluid feed pump 15 to the fluid feed passageway 14 is not only passed over to the fluid inlet port 7a of the steering pressure control valve 7 as above discussed but also circulated to the fluid reservoir 17 through the branch passageway 41, the first fluid inlet port 26, the first fluid inlet and discharge passageways 38 and 38', the passageway 40 and the fluid discharge port 28 in the valve casing 22 and further through the fluid discharge passageway 16' by way of the first circumferential groove 48 in the valve spool 44. The fluid delivered from the pump 15 to the fluid feed passageway 14 is thus circulated to the fluid reservoir 17 partially through the steering pressure control valve 7 and partially but in a major proportion through the first fluid-flow control valve 20 in shunt across the control valve 7. The flow of fluid through the fluid feed passageway 14 is subjected to a resistance which is lessened by the proportion of the fluid flow passed through the first fluid-flow control valve 20 and gives rise to a decrease in the burden imposed on the fluid feed pump 15. The reduction in the burden on the fluid feed pump 15 in turn results in reduction of the load to which the internal combustion engine or any other form of power unit driving the pump 15 is subjected. The proportion between the flow of fluid through the steering pressure control valve 7 and the flow of fluid through the first fluid-flow control valve 20 can be adjusted by varying the flow rate of fluid through the axial bore or orifice in the fitting 29 in the fluid inlet port 26 of the control valve 20. Since the flow rate of fluid through the first fluid-flow control valve 20 is thus restricted by the orifice in the fitting 29, the fluid pressure in the fluid inlet port 7a of the pressure control valve 7 remains at all times higher than a predetermined value and assures the steering power cylinder assembly 8 to create a proper differential pressure between the first and second pressure acting chambers 12 and 13 thereof immediately upon actuation of the control valve 7, viz., when the steering wheel 3 is caused to turn. On the other hand, the fluid discharged from the fluid outlet port 7b of the steering pressure control valve 7 to the fluid discharge passageway 16 as also discussed above is circulated to the fluid reservoir 17 through the second fluid inlet port 27, the second fluid inlet and discharge passageways 39 and 39', the passageway 40 and the fluid discharge port 28 in the valve casing 22 and further through the fluid discharge passageway 16' by way of the second circumferential groove 49 in the valve spool 44 and the internal circumferential groove 52 in the valve casing portion 22b.

When, now, the steering wheel 3 is driven to turn by a driver's manual steering effort applied thereto, the power piston 11 and the toothed rack member 10 of the steering power cylinder assembly 8 are axially driven to move in either direction in the cylinder housing portion 6b of the steering gear housing 6 by the pinion gear 9 connected to the steering shaft 2. The turn of the steering wheel 3 further establishes a left-turn or right-turn driving condition in the steering gear unit 5 and accordingly in the steering pressure control valve 7 thereof. When the left-turn or right-turn driving condition is established in the control valve 7, the fluid inlet port 7a of the control valve 7 is permitted to communicate with one of the control fluid ports 7c and 7d while the fluid outlet port 7b is permitted to communicate with the other of the ports 7c and 7d. As a consequence, the pressurized fluid delivered from the pump 15 to the fluid feed passageway 14 is passed by way of the fluid inlet port 7a and one of the control fluid ports 7c and 7d of the valve 7 to the steering pressure control fluid passageway 18 or 19 and enters one of the pressure acting chambers 12 and 13 of the steering power cylinder assembly 8. The fluid pressure thus admitted into one of the pressure acting chambers 12 and 13 acts on the power piston 11 and urges the power piston 11 and accordingly the rack member 10 to axially move in a direction in which the rack member 10 is driven to move in the cylinder housing portion 6b by means of the steering wheel and shaft assembly 1. Under these conditions, the other of the pressure acting chambers 12 and 13 communicates through the other of the steering pressure control fluid passageways 18 and 19 and the other of the control fluid ports 7c and 7d and the fluid outlet port 7b of the valve 7 and further by way of the fluid discharge passageway 16 with the second fluid inlet port 27 of the first fluid-flow control valve 20.

The fluid pressure in one of the first and second pressure acting chambers 12 and 13 of the steering power cylinder assembly 8 is in this manner rendered higher than the fluid pressure in the other of the pressure acting chambers 12 and 13 when the left-turn or right-turn condition is produced in the steering pressure control valve 7. The differential fluid pressure thus created between the first and second pressure acting chambers 12 and 13 of the cylinder assembly 8 results in development of a differential fluid pressure between the first and second control pressure acting chamber portions 23a and 23b of the fluid-flow control valves 20 and 21 through the control fluid passageways 42 and 43, respectively. The differential fluid pressure thus developed between the pressure acting chamber portions 23a and 23b of the axial cavity 23 acts on the valve spool 44 and forces the valve spool 44 to axially move in either direction in the axial cavity 23 against the force of one of the compression springs 50 and 51. The differential fluid pressure which acts on the valve spool 44 is thus largely proportional to the differential fluid pressure created between the fluid inlet and outlet ports 7a and 7b of the steering pressure control valve 7 by the driver's manual effort applied to the steering wheel 3. Furthermore, the flow rates of fluid through the variable-area orifices each formed between each of the fluid inlet passageways 38 and 39 and each of the first and second circumferential grooves 48 and 49 in the valve spool 44 are continuously variable with distance of movement of the valve spool 44 in the axial cavity 23 and accordingly with the differential fluid pressure developed between the pressure acting chamber portions 23a and 23b. For these reasons, the differential fluid pressure between the fluid feed passageway 14 and the fluid discharge passageway 16 and accordingly the differential fluid pressure between the first and second pressure acting chambers 12 and 13 of the steering power cylinder assembly 8 vary continuously with the driver's manual effort applied to the steering wheel 3. The result is, thus, that the amount of steering assistance achieved by the steering power cylinder assembly 8 varies continuously with the manual effort applied to the steering wheel and shaft assembly 1. In this instance, the flows of fluid through the fluid feed and discharge passageways 14 and 16 are subjected to resistances which gradually increase with the decreases in the flow rates of fluid through the above mentioned variable-area orifices as the valve spool 44 is axially moved in either direction from the initial equilibrium axial position thereof in the axial cavity 23. Because, however, of the fact that the fluid pressure in the fluid feed passageway 14 is still relieved through the first fluid-flow control valve 20, the resistance exercised on the flow of fluid in the fluid feed passageway 14 and accordingly the burden imposed on the fluid feed pump 15 are alleviated by the valve 20.

If the differential fluid pressure developed between the first and second pressure acting chamber portions 23a and 23b of the axial cavity 23 is higher than a first predetermined value, the first circumferential groove 48 in the valve spool 44 is axially displaced past the first fluid inlet and discharge passageways 38 and 38′ in the first fluid-flow control valve 20 as the valve spool 44 is axially moved from the initial equilibrium axial position thereof. The communication which has been established between the passageways 38 and 38′ through the circumferential groove 48 in the value spool 44 is now blocked by either the first land portion 45 or the third land portion 47 of the valve spool 44 depending upon the direction of movement of the valve spool 44 in the axial cavity 23. It therefore follows that the pressurized fluid delivered from the fluid pump 15 to the fluid feed passageway 14 is totally directed via the fluid inlet port 7a and one of the first and second control fluid ports 7c and 7d of the control valve 7 to the first pressure acting chamber 12 or the second pressure acting chamber 13 of the steering power cylinder assembly 8. In this fashion, the fluid pressure developed by the fluid feed pump 15 totally contributes to the power-assisted steering of the vehicle when the differential fluid pressure between the fluid inlet and outlet ports 7a and 7b of the control valve 7 is higher than a predetermined value. If, furthermore, the differential fluid pressure developed between the first and second pressure acting chamber portions 23a and 23b of the axial cavity 23 is higher than a second predetermined value, the second circumferential groove 49 in the valve spool 44 is axially displaced past the second fluid inlet and discharge passageways 39 and 39′ in the second fluid-flow control valve 21 and is occluded as the valve spool 44 is axially moved from the initial equilibrium axial position thereof. The passageways 39 and 39′ are now covered by either the second land portion 46 or the third land portion 47 of the valve spool 44 depending upon the direction of movement of the valve spool 44 in the axial cavity 23. The communication which has been established between the passageways 39 and 39′ through both the second circumferential groove 49 in the valve spool 44 and the previously mentioned internal circumferential groove 52 in the valve casing portion 22b is now provided through the internal circumferential groove 52 alone. As a consequence, fluid is allowed to flow from the fluid inlet passageway 39 to the fluid discharge passageway 39′ through the axial cavity 23 at a rate which is restricted by the internal circumferential groove 52 and gives rise to an increase in the fluid pressure in the fluid discharge passageway 16 communicating with the fluid inlet passageway 39. The increased fluid pressure in the fluid discharge passageway 16 reduces the vacuum developed in the steering pressure control valve 7 and thereby precludes the occurrence of cavitation in the valve 7.

It may be mentioned that the motion of the valve spool 44 is not affected by the viscosity of the fluid directed into the fluid inlet passageways 38 and 38′ in the valve casing 22. This is because of the fact that the valve spool 44 is caused to move in response to a differential fluid pressure between the first and second pressure acting chamber portions 23a and 23b into which the fluid pressures in the first and second pressure acting chambers 12 and 13 of the steering power cylinder assembly 8 are directly introduced.

While only one preferred embodiment of an apparatus according to the present invention has been herein described, it will be apparent that such an embodiment is simply illustrative of the gist of the present invention and may for this reason be modified and/or changed in numerous manners if desired. For example, the bypass means which has been described being constituted by the internal circumferential groove 52 formed in the valve casing 22 may be substituted by any bypass passageway formed in the valve casing 22 in such a manner as to bypass the second circumferential groove 49 in the valve spool 44 or even the axial cavity 23 formed in the valve casing 22 and to provide constant communication between the fluid inlet and discharge passageways 39 and 39′ or between the second fluid inlet port 27 and the fluid discharge port 28 in the valve casing 22 or even direct between the fluid discharge passageways 16 and 16′. While, furthermore, the first and second fluid-flow control valves 20 and 21 are constructed integrally in the valve casing 22 which is common to the valves, the valves 20 and 21 may be constructed independently of each other in a common valve casing or in valve casings respectively proper to the valves. When the first and second fluid-flow control valves in an apparatus according to the present invention are thus constructed independently of each other, each of the valves should be constructed and arranged as to have two control pressure acting chambers respectively similar to the first and second pressure acting chamber portions 23a and 23b of the cavity 23 in the valve casing 22 of the embodiment described. In this instance, the valve spool forming part of each of the valves is constructed to have a combination of two land portions arranged similarly to each of the combination of the first and third land portions 45 and 47 and the combination of the second and third land portion 46 and 47 in the first and second fluid-flow control valves 20 and 21 of the described embodiment.

What is claimed is:

1. A fluid-operated control apparatus for a power-assisted steering system including a steering wheel and shaft assembly rotatable about an axis therethrough in a steerable vehicle, comprising:

fluid-displacement means including a suction port to suck in supplied fluid and a delivery port to deliver fluid under pressure therefrom;

a steering pressure control valve responsive to turning motion of said steering wheel and shaft assembly and having fluid inlet and outlet ports respectively communicable with the delivery and suction ports of said fluid displacement means, and two control fluid ports, the control valve being shiftable between a condition providing communication between the fluid inlet and outlet ports and having said control fluid ports isolated from the fluid inlet and outlet ports, and a condition providing communication between the fluid inlet port and one of the control fluid ports and between the fluid outlet port and the other of the control fluid ports;

a steering power cylinder assembly comprising a housing and a piston connected to said steering wheel and shaft assembly and movable in the housing for having formed therein two pressure acting chambers separate from each other across the piston and respectively communicating with said control fluid ports; and first and second fluid-flow control valves each having a valve casing portion formed with a cavity, a fluid inlet port and a fluid discharge port communicating with the suction port of said fluid displacement means, each of the fluid-flow control valves comprising (1) differential pressure producing means operative to develop in said cavity a differential pressure continuously variable with a differential pressure between the pressure acting chambers of the cylinder assembly, (2) a valve member movable in said cavity and responsive to the differential fluid pressure developed by said differential pressure producing means, and (3) biasing means urging the valve member to stay in a predetermined equilibrium position in the cavity in the absence of a differential fluid pressure acting thereon for providing full communication between the fluid inlet and discharge ports of each fluid-flow control valve when the valve member is in the equilibrium position thereof and being movable from the equilibrium position a distance which is continuously variable with the differential fluid pressure acting on the valve member;

the fluid inlet port of the first fluid-flow control valve being in constant communication with the delivery port of said fluid displacement means and with the fluid inlet port of said steering pressure control valve, and the fluid inlet port of the second fluid-flow control valve being in constant communication with the fluid outlet port of the steering pressure control valve, the valve member of the first fluid-flow control valve being operative to block the communication between the fluid inlet and discharge ports of the first fluid-flow control valve when the differential fluid pressure acting thereon is higher than a first predetermined value and the valve member of the second fluid-flow control valve being operative to block the communication between the fluid inlet and discharge ports of the second fluid-flow control valve when the differential fluid pressure acting thereon is higher than a second predetermined value, said second fluid-flow control valve further comprising bypass means providing constant communication between the fluid outlet port of said steering pressure control valve and the suction port of said fluid displacement means without respect to the position of the valve member of the second fluid-flow control valve in the cavity thereof.

2. A fluid-operated control apparatus as set forth in claim 1, in which said bypass means comprises an internal circumferential groove formed in the casing portion of said second fluid-flow control valve and surrounding a portion of the cavity in the casing portion.

3. A fluid-operated control apparatus as set forth in claim 1, in which said first fluid-flow control valve further comprises flow restriction means provided in the fluid inlet port thereof.

4. A fluid-operated control apparatus as set forth in claim 1, 2 or 3, in which the respective cavities of the first and second fluid-flow control valves are formed by a common axial cavity extending in part in the casing portion of the first fluid-flow control valve and in part in the casing portion of the second fluid-flow control valve and in which the respective valve members of said first and second fluid-flow control valves are constituted by a unitary valve spool having first, second and third land portions axially spaced apart from each other to form a first circumferential groove between the first and third land portions and a second circumferential groove between the second and third land portions, wherein said valve spool assumes a predetermined equilibrium axial position in said axial cavity and has each of the respective valve members of the first and second fluid-flow control valves held in said equilibrium position of the valve member.

5. A fluid-operated control apparatus as set forth in claim 1, 2 or 3, in which said differential pressure producing means of each of said first and second fluid-flow control valves comprises two control pressure acting chamber portions respectively communicating with said pressure acting chambers of the cylinder assembly and forming part of the cavity in the casing portion of each of the first and second fluid-flow control valves.

6. A fluid-operated control apparatus as set forth in claim 4, in which said differential pressure producing means comprises two control pressure acting chamber portions respectively communicating with said pressure acting chambers of the cylinder assembly and forming part of the common axial cavity.

* * * * *